No. 861,889. PATENTED JULY 30, 1907.
F. J. PETERMÖLLER.
VALVE MOTION FOR EXPLOSIVE ENGINES.
APPLICATION FILED DEC. 7, 1906.

2 SHEETS—SHEET 1.

WITNESSES

INVENTOR
FRANZ JOSEPH PETERMÖLLER
BY
HIS ATTORNEYS

No. 861,889. PATENTED JULY 30, 1907.
F. J. PETERMÖLLER.
VALVE MOTION FOR EXPLOSIVE ENGINES.
APPLICATION FILED DEC. 7, 1906.

2 SHEETS—SHEET 2.

WITNESSES

INVENTOR
FRANZ JOSEPH PETERMÖLLER
BY
HIS ATTORNEYS

UNITED STATES PATENT OFFICE.

FRANZ JOSEPH PETERMÖLLER, OF BRUNSWICK, GERMANY.

VALVE-MOTION FOR EXPLOSIVE-ENGINES.

No. 861,869.  Specification of Letters Patent.  Patented July 30, 1907.

Application filed December 7, 1906. Serial No. 346,771.

*To all whom it may concern:*

Be it known that I, FRANZ JOSEPH PETERMÖLLER, engineer, a subject of the Emperor of Germany, residing at Brunswick, Duchy of Brunswick, Empire of Germany, have invented certain new and useful Improvements in and Connected with Valve-Motions for Explosion-Engines, of which the following is a specification.

In regulating the degree of charge of explosion engines by means of valves, which are controlled from the governor, great pressure against the governor is produced, which is brought about by the extent and long duration of the valve lift and the want of a balance of the valves.

Now this invention has for its object to counteract the effects of this back pressure.

In the accompanying drawings an example of such a valve motion is shown.

Figure 1:
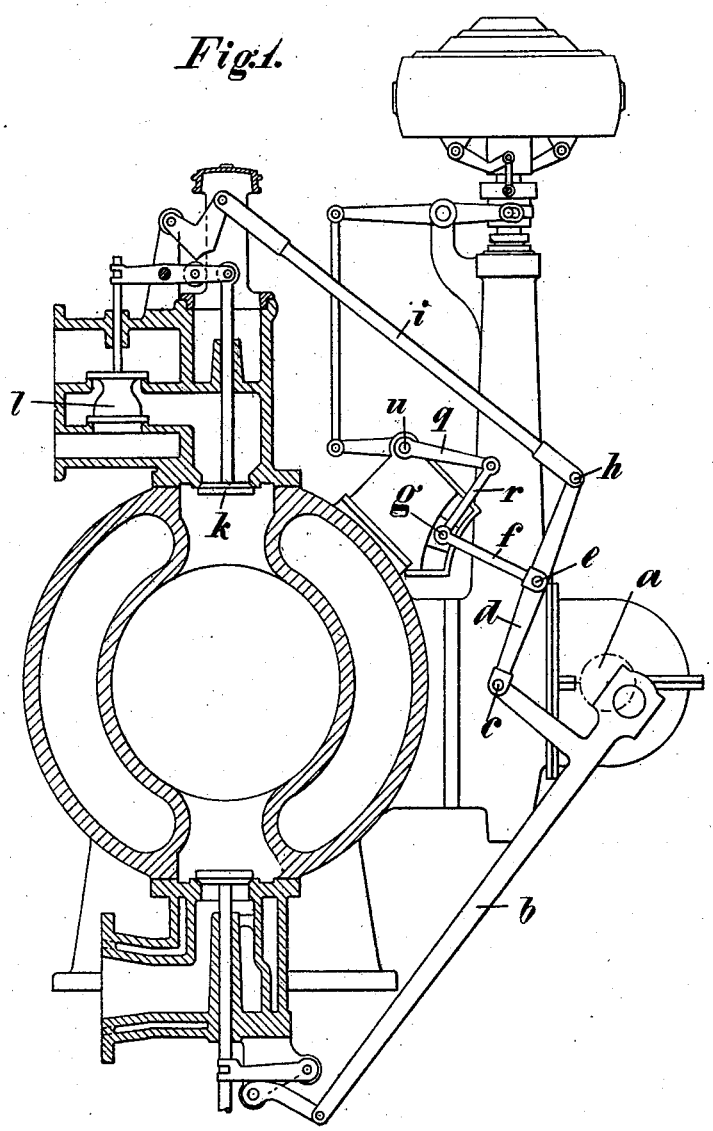

In addition to the actual inlet valve $k$ (Figure 1), which shuts off the high pressure and the hot gases of the cylinder, a separate mixing valve $l$ is provided, which allows of a separate admission of gas and air and prevents a mutual influencing of both. From an eccentric rod $b$ operated by the driving shaft $a$ the rock lever $d$ is set in movement at the point $c$, which lever is so influenced at its hinge point $e$ by a link $f$, that by the displacement of the pivot $g$ of this lever, the path traversed by the point $h$ and therewith the movement of the inlet rod $i$ is altered, whereby an alteration of the duration of lift of the inlet valve $k$ and the mixing valve $l$ connected therewith is obtained.

Figure 2:
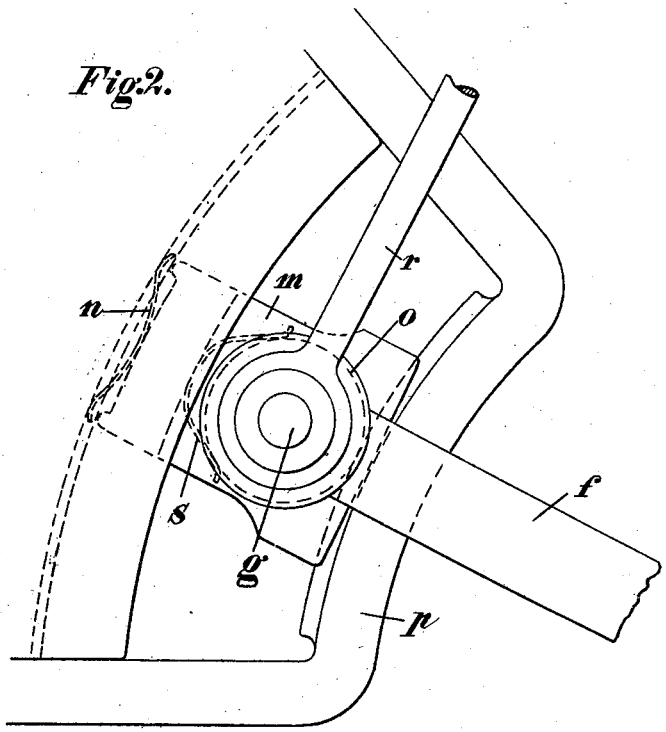
Figure 3:
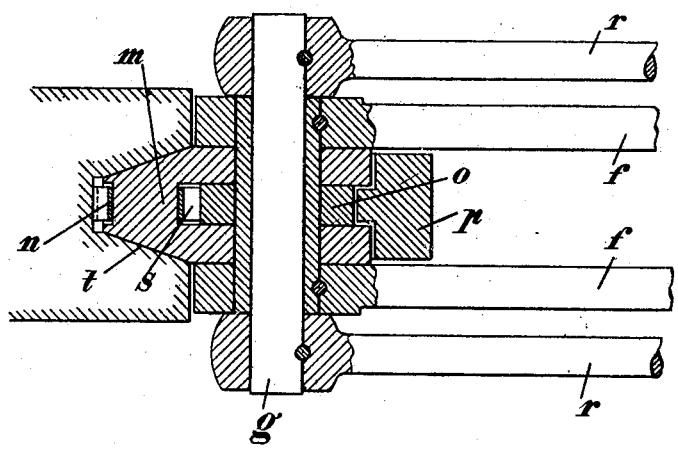

A carriage $m$ and a roller $o$ (Figs. 2 and 3) are connected with the pivot $g$. The carriage $m$ slides in a wedge-shaped guide $t$ in such a way that it is jammed as soon as any pressure forces it into this wedge track (which takes place during each opening of the valves $k$ and $l$) and it is again released as soon as the valve lift is ended and a pull on the link $f$ is produced by the weight of the rod itself. A spring $n$ may assist this lifting out of the carriage $m$. The valve motion rod now rests with a roller $o$ on the guide $p$, so that the governor by means of the shaft $u$, arm $q$ (Fig. 1), and rod $r$ may easily displace the pivot $g$. A spring $s$ which is connected with the slide block $m$ and presses on the roller $o$, prevents the rotation and consequent jamming of the block in the slide track $t$ when moved. In order in spite of the clamping device, to allow of the governor acting on the non-opened valve on the other side of the cylinder, the connection of the regulating shaft $u$ with the pivot $g$ may be made elastic by the insertion of spring parts.

I declare that what I claim is:—

A valve motion for explosion engines comprising operating links, a movable pivot for one of said links, a slide block from which said pivot is supported, a governor rod adapted to regulate the position of said slide block and guides for said slide block one of which acts to clamp the slide block in position substantially as described.

In testimony whereof I have hereunto set my hand in presence of two subscribing witnesses.

FRANZ JOSEPH PETERMÖLLER.

Witnesses:
 WILHELM LEHRKE,
 JULIUS SECKEL.